(12) United States Patent
Focke et al.

(10) Patent No.: US 6,688,077 B1
(45) Date of Patent: Feb. 10, 2004

(54) METHOD OF, AND APPARATUS FOR, HANDLING (CIGARETTE) PACKS (75) Inventors: Heinz Focke, Verden (DE); Thomas Häfker, Langwedel-Etelsen (DE); Johann Köster, Verden (DE)

(73) Assignee: Focke & Co. (GmbH), Verden (DE)

( * ) Notice: Subject to any disclaimer, the term of this patent is extended or adjusted under 35 U.S.C. 154(b) by 0 days.

(21) Appl. No.: 09/517,260

(22) Filed: Mar. 2, 2000

(30) Foreign Application Priority Data

Mar. 3, 1999  (DE) .......................................... 199 09 161

(51) Int. Cl.[7] ................................................ B65B 11/28
(52) U.S. Cl. ...................... 53/234; 53/373.7; 53/375.9; 53/376.2
(58) Field of Search .................. 53/477, 373.7, 53/376.2, 375.9, 147, 234.8; 198/626.1, 418.5, 429

(56) References Cited

U.S. PATENT DOCUMENTS

| 4,330,977 A | | 5/1982 | Focke |
| 4,843,800 A | | 7/1989 | Focke |
| 4,932,190 A | * | 6/1990 | Bergner et al. |
| 4,934,129 A | * | 6/1990 | Hoffman et al. |
| 5,570,563 A | * | 11/1996 | Focke et al. |
| 5,575,712 A | * | 11/1996 | Krewer |
| 5,733,099 A | * | 3/1998 | Honneger .................... 414/788 |
| 5,996,310 A | * | 12/1999 | Bailey et al. |
| 6,038,832 A | * | 3/2000 | Focke et al. |
| 6,054,665 A | * | 4/2000 | Focke et al. |

FOREIGN PATENT DOCUMENTS

| DE | 36 38 627 A1 | 5/1988 |
| DE | 42 25 494 A1 | 10/1993 |
| DE | 43 34 479 A1 | 5/1994 |
| DE | 195 29 139 A1 | 2/1997 |
| EP | 0 168 548 B1 | 4/1990 |
| GB | 941 490 | 11/1963 |

* cited by examiner

Primary Examiner—Eugene Kim
(74) Attorney, Agent, or Firm—Thomas, Kayden, Horstemeyer & Risley LLP; Todd Deveau (57) ABSTRACT Apparatus for handling (cigarette) packs, in particular for transporting and sealing the same. (Cigarette) packs (10) coming from a packaging machine or a folding turret (11) are transported in the region of a sealing subassembly (22) by a pocket conveyor (26), laterally arranged sealing jaws (35, 36) sealing sideways-directed end walls during a stand-still phase. The packs (10) are fed, via an intermediate conveyor (23), to an accumulating conveyor (24) and, finally, to a pushing-off station (25) for the formation of pack groups (55) which are to be pushed off transversely. By virtue of relative movement, the pack group (55) is separated off from a following line of packs (52).

14 Claims, 7 Drawing Sheets

METHOD OF, AND APPARATUS FOR, HANDLING (CIGARETTE) PACKS

FIELD OF THE INVENTION

The invention relates to a method of handling (cigarette) packs, in particular during the production of bundle packs for pack groups which are formed by virtue of being separated off from a continuous line of packs comprising (cigarette) packs positioned in close proximity to one another. The invention also relates to an apparatus for implementing the method.

BACKGROUND OF THE INVENTION

Bundle packs comprise a pack group which is usually to be enclosed by an outer wrapper. In the case of cigarette bundle packs, the pack group comprises, for example, ten cigarette packs which are located in two rows one above the other. The pack group is formed in that a continuous line of packs comprising closely abutting (cigarette) packs is fed and the pack group is separated off by virtue of being pushed off transversely. This pack group is then fed to a packaging station in order to be packaged in the outer wrapper.

The increasing output capacity of packaging machines, in particular of cigarette packers, requires measures for higher outputs of a bundle pack packer and/or further conveying and handling subassemblies which follow a packaging machine and are intended for the packs, without said packs being exposed to undesired mechanical loading.

SUMMARY OF THE INVENTION

The object of the invention is to propose measures for handling (cigarette) packs following the packaging machine, namely in particular during the production of bundle packs, which allow a higher output, that is to say a higher operating speed, in particular mechanical loading of the packs being avoided in the process.

In order to achieve this object, the method according to the invention is characterized in that the pack group is separated off from the following line of packs by relative movement so that a distance is formed between the pack group, on the one hand, and the line of packs, on the other hand, and in that the pack group is then conveyed away, in particular pushed off in the transverse direction.

The invention is based on the finding that it is problematic to push pack groups transversely from a fed line of packs comprising closely arranged packs. By virtue of the relevant movement, the pack group is first of all freed and then pushed off.

According to a further feature of the invention, the line of packs is moved back counter to the conveying direction, to be precise a larger distance from the pack group being formed in the process. The larger distance means that the line of packs can be accelerated in the direction of the pushing-off position even when a transversely acting pushing-off means is still executing the return movement. The output of the apparatus is thus increased without the packs being adversely affected.

Another, particular area to be dealt with is the sealing of cigarette packs, in particular of a sealable-film outer wrapper of the same. The pushing-off station of the pack groups has arranged upstream of it a sealing station or a sealing subassembly. In the region of the latter, the packs are transported individually or in pairs, located one above the other, by a pocket conveyor which receives in each case an individual cigarette pack or two cigarette packs located one above the other. Lateral sealing elements are of specific design and are provided for sealing sideways-directed end and base surfaces.

Further features of the invention deal with the configuration and operation of conveying elements for (pairs) of (cigarette) packs, of the line of packs and of the sealing subassembly.

Further details of the invention are explained more specifically hereinbelow with reference to the drawings, in which.

BRIEF DESCRIPTION OF THE DRAWING

DETAILED DESCRIPTION OF THE DRAWINGS

The packs 10 illustrated in the drawings are cuboidal cigarette packs. These come from a packaging machine. Of the latter, the drawings show a folding turret 11, in the region of which the packs 10 are provided with an outer wrapper made of a (sealable) film. The packs 10 comprise mutually opposite front wall 12 and rear wall 13, narrow elongate side walls 14 and 15 and small end walls 16 and 17, or an end wall and base wall. In the region of the folding turret 11, overlapping side tabs of the outer wrapper are connected to one another in the region of a radially outwardly directed side wall 14 by sealing, to be precise by a pivotable sealing element 18.

The packs 10 which have been prepared thus far are pushed out of the folding turret 11, radially along a horizontal center plane of said folding turret, into a pack path 19. The latter is adjoined by an upright conveyor 20 which transfers the packs to a horizontal conveying section 21. In the region of this conveying section 21, the packs 10 are conveyed in small groups, namely with in each case two packs 10 arranged one above the other. In this case, said packs have their front wall 12 and rear wall 13 butting against one another. The side walls 14, 15 extend transversely to the conveying direction. The end walls 16 and 17 are directed sideways.

In the region of the conveying section 21, the packs 10 pass first of all into a sealing subassembly 22 for the purpose of sealing the outer wrapper in the region of the sideways-directed end walls 16, 17. Thereafter, the packs 10 are received by an intermediate conveyor 23. This is followed by an accumulating conveyor 24 and, finally, by a pushing-off station 25.

The first portion of the conveying section 21 is designed as a pocket conveyor 26, as part of the sealing subassembly 22. The pocket conveyor 26 comprises an endless conveyor, namely a toothed belt 27 with outwardly projecting carry-along elements 28. These are designed as transversely projecting webs which extend approximately over the width of the toothed belt 27. These, in turn, are of a smaller width than the packs 10 in the direction transverse to the toothed belt 27.

Figure 1:
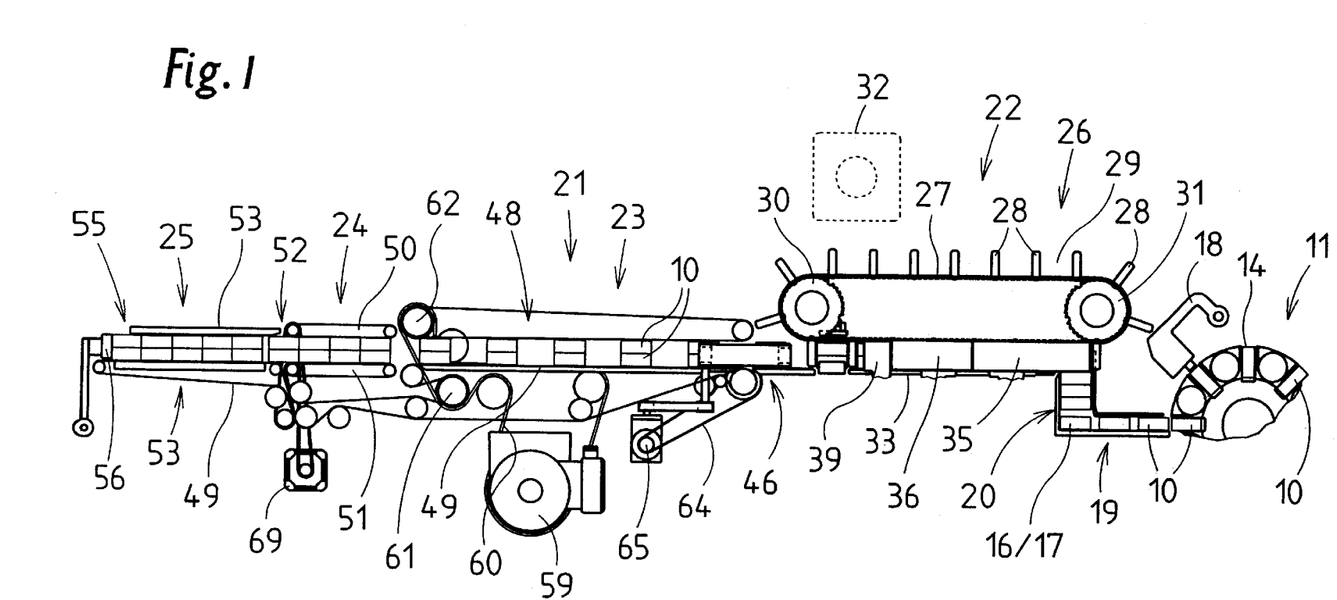
FIG. 1 shows a side view of an apparatus for handling (cigarette) packs.
Figure 2:
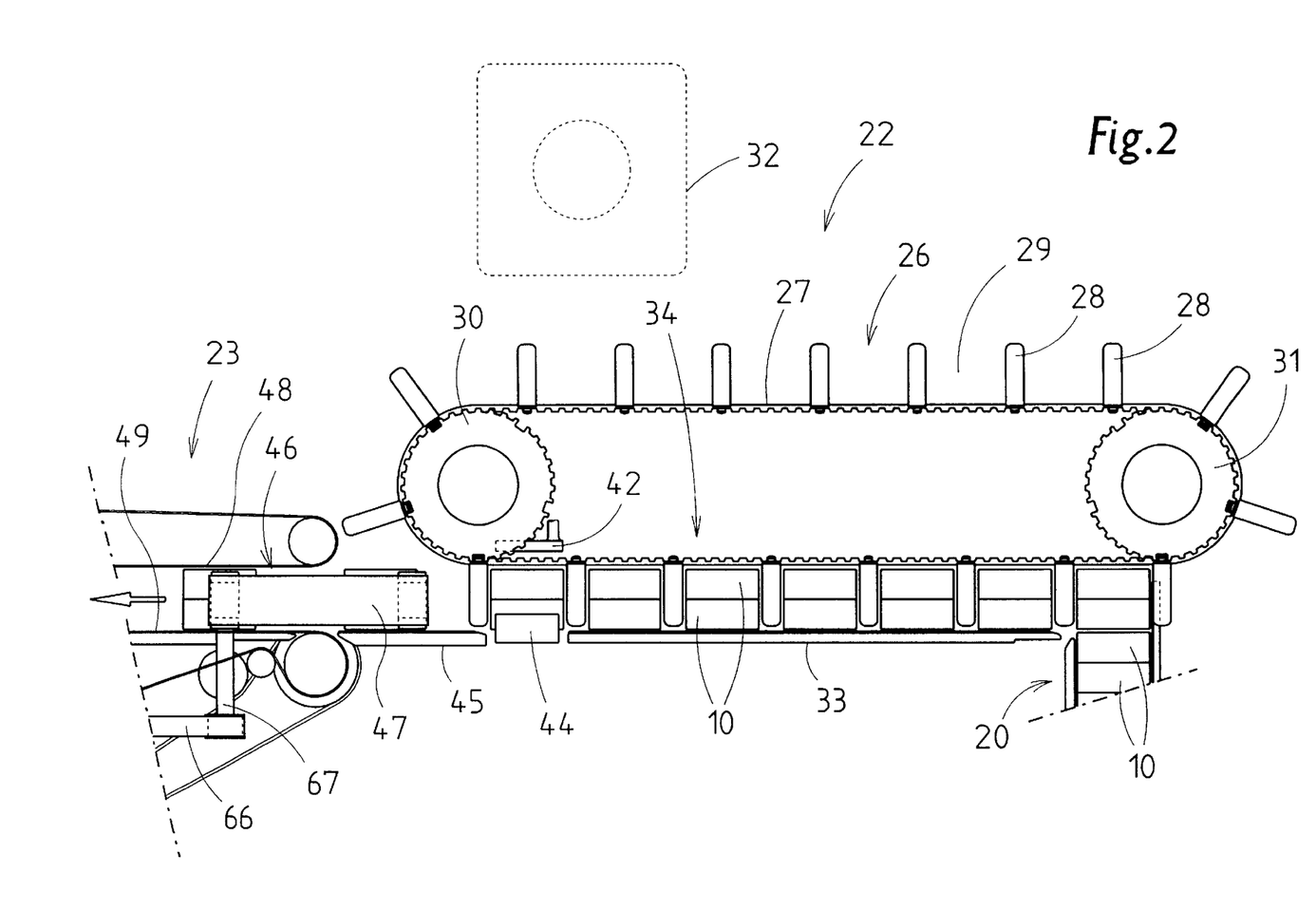
FIG. 2 shows, on an enlarged scale, a subregion of the apparatus according to FIG. 1, namely a sealing subassembly.

Two adjacent carry-along elements 28 form a pocket 29, which receives two packs 10 arranged one above the other. The dimension of the carry-along elements 28 perpendicular to the toothed belt 27 is somewhat smaller than the dimension of the two packs 10 arranged one above the other (e.g. FIG. 2).

The toothed belt 27 runs over gear wheels 30, 31, of which one gear wheel, e.g. gear wheel 30, is driven, to be precise by a servomotor 32. The gear wheels 30, 31, as deflecting elements for the toothed belt 27, cause the pockets 29 to open and close. This makes it possible for (two) packs 10 to be received in the region of the upright conveyor 20, namely for said packs to be pushed off from a stack of packs 10 formed here (e.g. FIG. 2). For this purpose, the pocket conveyor 26 is positioned above the movement path of the packs 10 and above the upright conveyor 20. The packs 10 are transported (with sliding action) on a horizontal underlying surface 33, to be precise as a result of being carried along by the successive carry-along elements 28, which each pass into a gap between successive groups of two packs 10.

Figure 4:
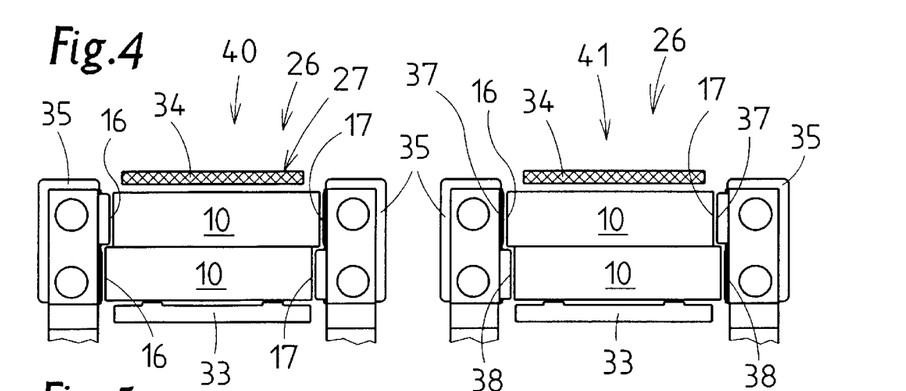
FIGS. 4 to 6 show, on an enlarged scale, details of the illustration in FIG. 3, namely cross sections along section planes IV, V and VI.
Figure 5:
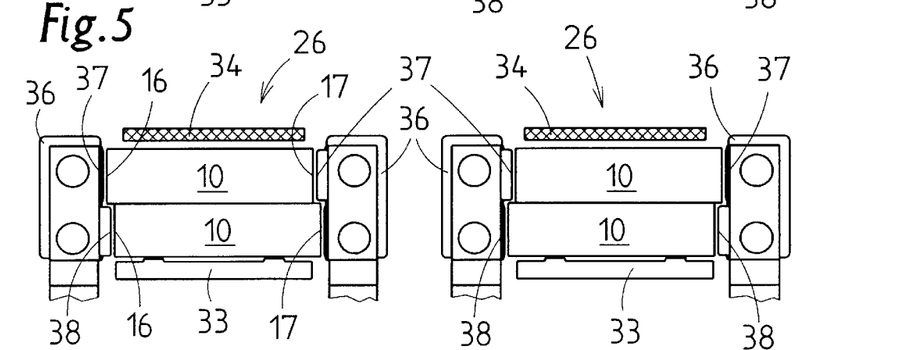

The packs 10 are transferred by the pocket conveyor 26, in the region of the gear wheel 30, to the intermediate conveyor 23 and transported further by the latter. In the region of the pocket conveyor 26, handling of the packs 10, to be precise sealing in the region of the sideways-directed end walls 16, 17, takes place. For this purpose, a bottom conveying strand 34 of the pocket conveyor 26 is assigned sealing elements, namely plate-like sealing jaws 35, 36. These are plate-like, heated and pressure-activated elements which are positioned on both sides of the movement path of the packs 10 (FIGS. 4 and 5). The sealing jaws 35, 36 are pressed onto the end walls 16, 17 of the packs 10. The first sealing jaws 35, as seen in the conveying direction, are dimensioned such that they cover the region of three pockets 29, that is to say of three pairs of packs 10, while the second sealing jaws 36 extend over two pockets 29. The pocket conveyor 26 is driven cyclically such that the sealing is carried out during a momentary standstill phase. The sealing jaws 35, 36 are then moved back from the end walls 16, 17 and the pocket conveyor 26, with the packs 10, can be moved further by the distance of one station, namely by the distance of one pocket 29. A new sealing cycle then takes place, with the result that the packs 10 are sealed gradually over a number of cycles. Depending on the material which is to be sealed, the sealing jaws 35, 36 may have different temperatures and/or sealing times and/or press-on forces.

A special feature is the configuration of sealing surfaces of the sealing jaws 35, 36, said sealing surfaces being directed towards the packs 10. Said sealing surfaces are arranged in a mutually offset manner, to be precise such that top and bottom sealing surfaces 37, 38 are assigned in each case to one end wall 16, 17 and are offset with respect to one another. The sealing jaws 35, 36 on the mutually opposite sides are provided with correspondingly designed sealing surfaces 37, 38, with the result that, when the sealing jaws 35, 36 are pressed onto the end walls 16, 17, the packs 10 located one above the other are displaced slightly with respect to one another (FIGS. 4 and 5). This prevents the adjacent packs 10 from being connected to one another when the outer film is sealed. The sealing surfaces 37, 38 are also of different, corresponding configuration in the conveying direction of the packs 10, namely from sealing jaw 35 to sealing jaw 36, so as to provide different relative positions during the sealing in these regions.

Following the sealing jaws 35, 36, the packs 10 located one above the other are aligned in the pockets 29, to be precise by laterally arranged aligning means 39 which can likewise be moved against the end walls 16, 17.

Figure 6:
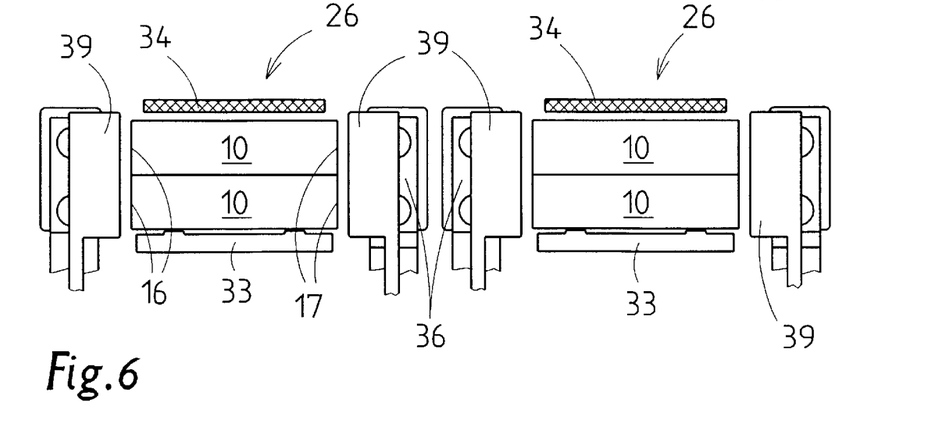

As can further be seen from FIGS. 4, 5 and 6, the apparatus is designed for double-path operation with the independent paths 40, 41 running parallel alongside one another.

Figure 9:
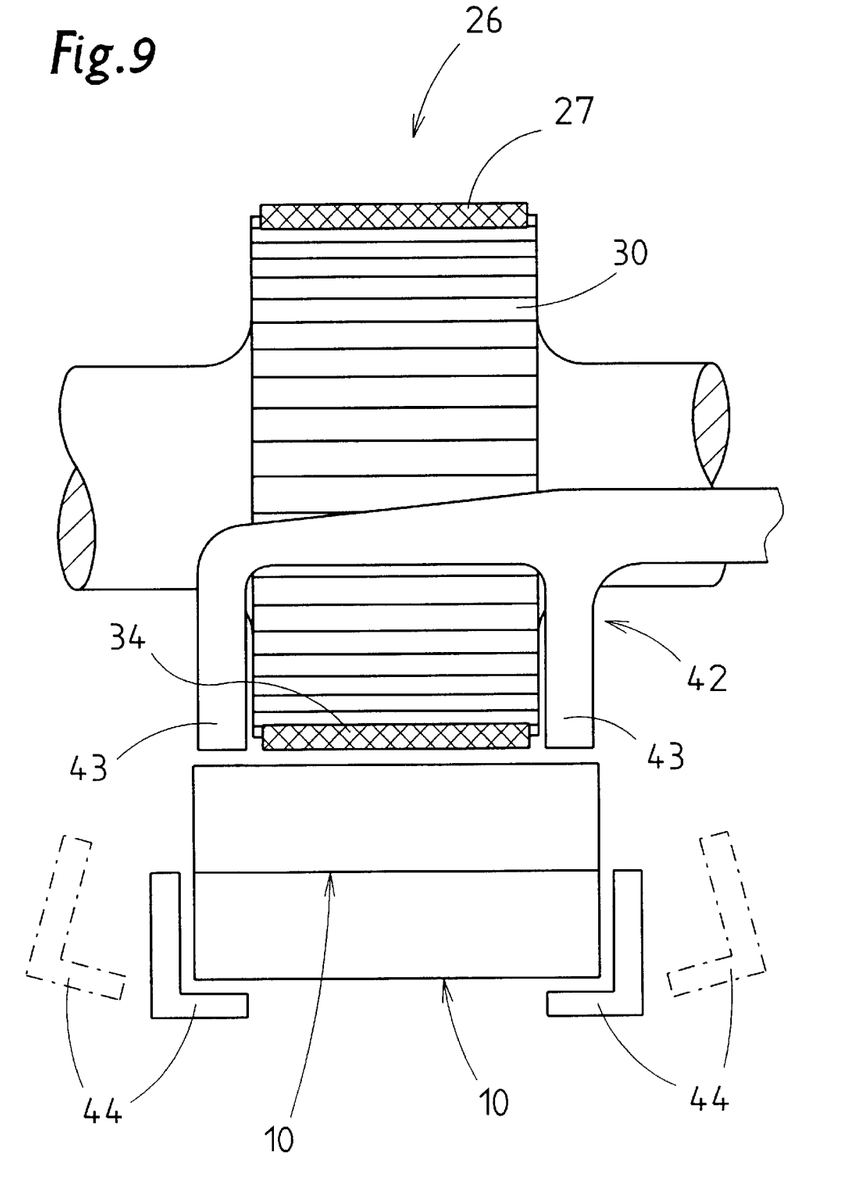
FIG. 9 shows, on a vastly enlarged scale, a detail in the region of the sealing station, in the cross section of the same.

An ejector 42 is positioned adjacent to the deflecting wheel or gear wheel 30, above the conveying strand 34. The fork-like ejector 42 separates out possibly defective packs 10 from the rest of the conveying process. For this purpose, the ejector 42 pushes out the packs 10 in the downward direction by way of legs 43 acting laterally alongside the toothed belt 27. Said packs are supported at the bottom, in the region of the ejector 42, by movable carrying elements, namely by carrying legs 44 which, for the purpose of ejecting defective packs 10, are moved sideways (chain-dotted lines in FIG. 9).

Figure 3:
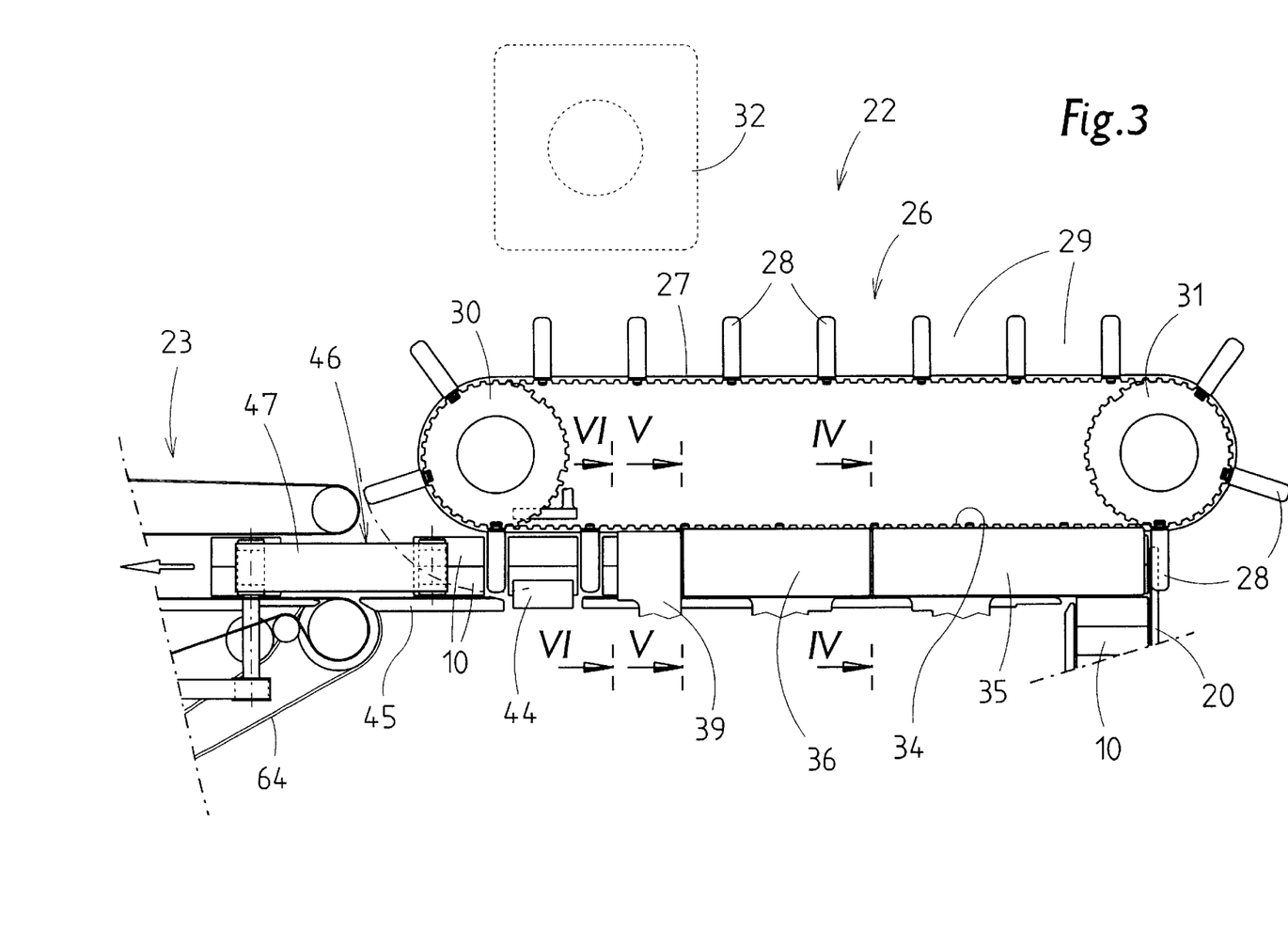
FIG. 3 shows a detail of FIG. 2 with sealing elements illustrated in addition.

In the region of the gear wheel 30, the packs 10 are pushed from the pocket conveyor 26 onto an intermediate carrier, namely onto a bridge plate 45. In the region of the latter, the packs 10 released from a pocket 29 are grasped by a transfer conveyor 26. The latter comprises two mutually opposite, lateral belts 47. The packs 10 pass, with the relative positioning unchanged, into the region between the mutually opposite belts 47 and—at elevated speed—are conveyed further. The packs are transferred from the pocket conveyor 26 to the transfer conveyor 46 by the movement of the carry-along elements 28 along a circle arc. The packs are conveyed in their entirety into the region of the transfer conveyor 46 (FIG. 3).

The transfer conveyor 46 transports the packs 10 into the region of the intermediate conveyor 23, which comprises a top belt 48 and a bottom belt 49. In this region, accordingly, the (two) packs 10 are grasped at the top and bottom, that is to say in the region of the large-surface-area front walls 12 and rear walls 13, and transported further. On account of the higher drive speed of the transfer conveyor 46 and of the intermediate conveyor 23, a larger distance is provided between the successive (pairs of) packs.

The groups of two packs 10 are transferred from the intermediate conveyor 23 to the accumulating conveyor, which likewise comprises a top belt 50 and a bottom belt 51. The packs 10 are accumulated in this region, this forming a line of packs 52 comprising packs 10 which follow closely one after the other, to be precise in each case two packs 10 aligned one above the other. This continuous line of packs 52 extends into the region of the pushing-off station 25. In this region, the packs 10 are transported by a bottom conveyor 53. A covering plate 54 is located on the top side.

The pushing-off station 25 and the length of the bottom conveyor 53 and of the covering plate 54 correspond approximately to the length of a pack group 55 which is to be pushed off, comprising five pairs of packs 10 arranged one above the other. The accumulated formation and/or the line of packs 52 is formed in that the packs 10 are conveyed against an end stop 56. The latter can be moved in the conveying direction by virtue of being arranged on a pivot arm 57. The entire pack group 55 is moved out of the region of the pushing-off station 25 transversely to the conveying direction by means of a transversely movable pushing-off means 58.

A special feature is that the pack group 55 which is to be pushed off is separated off from the following line of packs 52 before being pushed off, this forming a gap between the pack group 55 and line of packs 52.

The pack group 55 is separated off from the line of packs 52 by a number of measures. Firstly, following abutment of the line of packs 52 against the end stop 56, the latter is moved further in the conveying direction (chain-dotted position in FIG. 7), while the line of packs 52 is stopped in the region of the accumulating conveyor 24. This produces a first gap.

Figure 7:
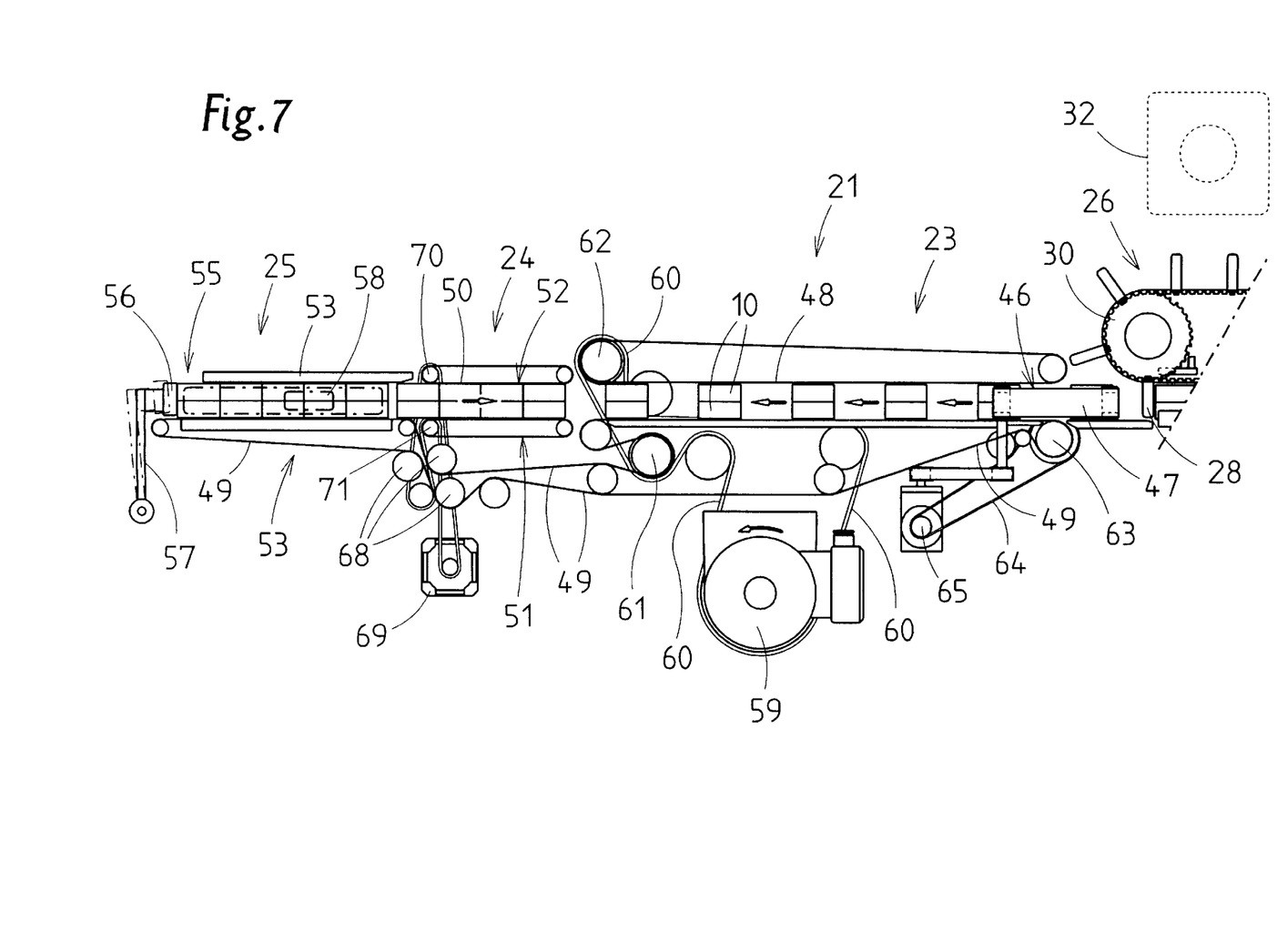
FIG. 7 shows, on an enlarged scale, a region of the apparatus according to FIG. 1 following the sealing station.

A further important measure is the backward conveying of the line of packs 52 by the accumulating conveyor 24 being driven correspondingly in the opposite direction (FIG. 7). The line of packs 52 divided off from the pack group 55 is conveyed in the opposite direction, to be precise into the region of the intermediate conveyor 23, receiving further pairs of packs 10 in the process. This, on the one hand, increases the size of the line of packs 52 and, on the other hand, produces a comparatively large gap in relation to the pack group 55 which is to be pushed off.

The pushing-off operation for the pack group 55 and the backward conveying of the line of packs 52 take place simultaneously. It is particularly important, however, for the line of packs 52 to be capable of being conveyed to the pushing-off station 25, by (renewed) reversal of the conveying direction, while the pushing-off means 58 is still executing the return movement into the starting position. Once said pushing-off means has reached the starting position, the line of packs 52 can run into the pushing-off station 25 at high or maximum conveying speed, this saving a considerable amount of time.

The conveying elements of the apparatus are driven in a specific manner and coordinated with one another as far as the drive and configuration are concerned.

The servomotor 32, which is assigned to the pocket conveyor 26, causes the pocket conveyor 26 to be driven cyclically, but also moves the aligning means 39 and the sealing jaws 35, 36 via corresponding gear mechanisms. It is also the case that the ejector 42 is actuated by the servomotor 32. The movements are controlled via corresponding cams. The servomotor 32 is controlled by the main machine via a rotary encoder (incremental encoder). The maximum speed of the pocket conveyor 26 may be, for example, approximately 14 m/min.

The intermediate conveyor 23 is driven by a dedicated motor, to be precise by a three-phase motor 59. The latter is connected, via a drive belt 60, to drive wheels 61, 62 for the top belt 48 and bottom belt 49 of the intermediate conveyor 23. The three-phase motor 59 always runs at the maximum speed, for example, of approximately 49.4 m/min. The drive belt 60 is designed as a double-sided toothed belt.

The transfer conveyor 46 is also driven (indirectly) by the intermediate conveyor 23, that is to say by the three-phase motor 59. Driving is executed via a deflecting wheel 63 of the bottom belt 49. From the latter, a drive 64 leads to a gear mechanism, namely an angular gear mechanism 65. The latter acts on the transfer conveyor 46 via a drive belt 66 and a drive shaft 67. The transfer conveyor 46 may thus be driven at maximum speed of the machine, with the result that the packs 10 can be conveyed away out of the opening pocket 29.

The bottom belt 49 of the intermediate conveyor 23 extends into the region of the pushing-off station 25, the accumulating conveyor 24 being bypassed in the process, and forms the bottom conveyor 53 of said pushing-off station. In this case, the bottom belt 49 is guided over a plurality of deflecting rollers 68.

The accumulating conveyor 24 is assigned an independent drive, namely a servodrive 69. This allows the accumulating conveyor 24, or the top belt 50 and bottom belt 51, to execute a conveying movement in two directions. The servodrive 69 acts on drive rollers 70, 71 of the top belt 50 and bottom belt 51 via drive belts.

Figure 8:
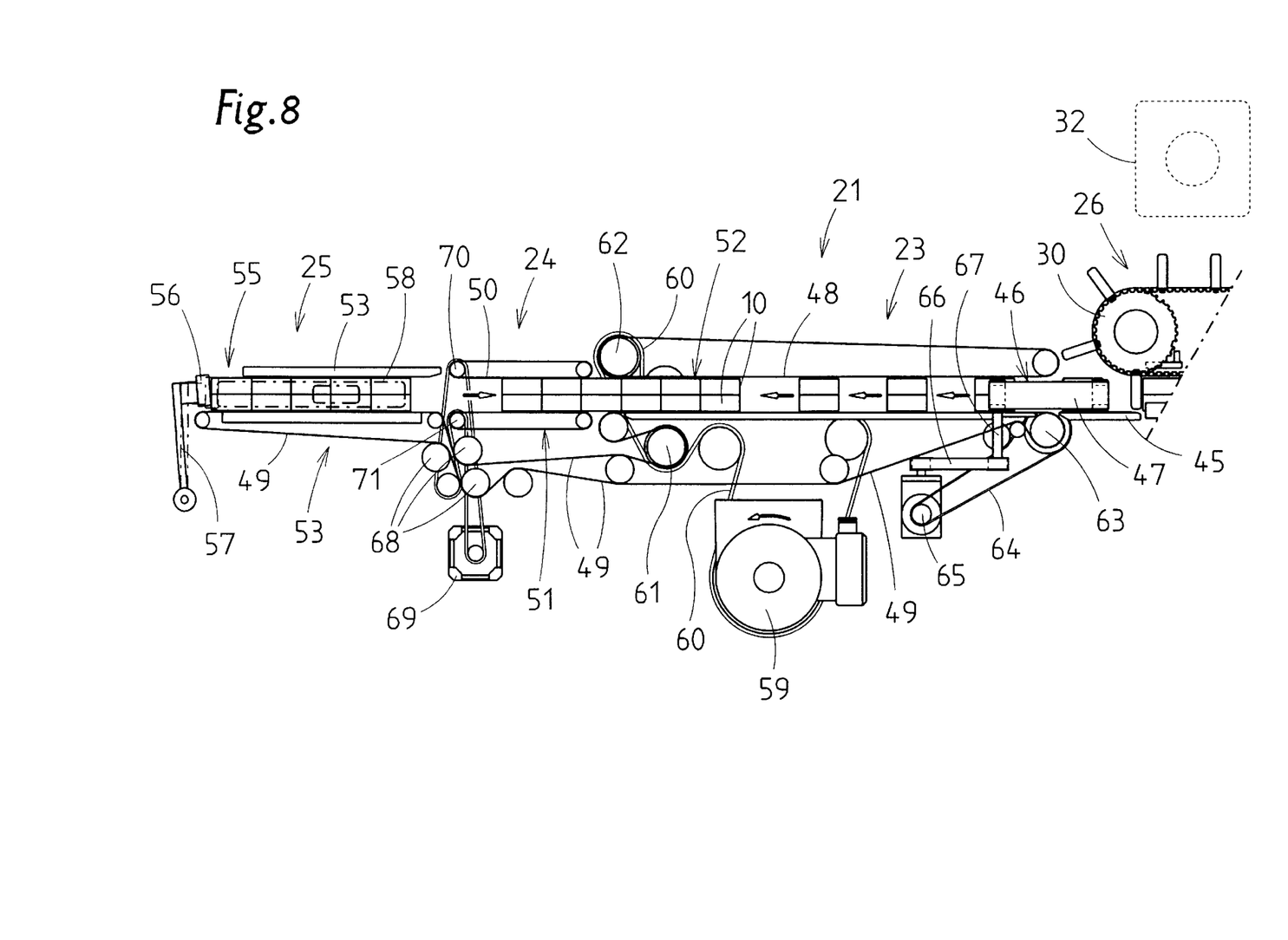
FIG. 8 shows the detail according to FIG. 7 with the position of conveying elements changed.

In order to ensure the aforementioned movement of the line of packs 52 in the opposite direction, the packs 10 are fixed between the top belt 50 and bottom belt 51 of the accumulating conveyor 24 with an increased retaining force. In contrast, the distances between the top belt 48 and bottom belt 49 of the intermediate conveyor 23 are selected such that the line of packs 52 can pass into the region of the intermediate conveyor 23 counter to the maintained conveying movement of the same (FIG. 8). The surfaces of the belts may be designed so as to assist this movement sequence.

The dimensions may advantageously selected such that, once it has been separated off from the pack group 55, the line of packs 52 is moved back by approximately 100 mm counter to the conveying direction into the position according to FIG. 8. The end stop 56 may travel 10 mm. The pack group 55 is pushed off when the end stop 56 is located in the drawn-back position, with the result that the pack group 55 is free on both sides.

It is also possible for the individual conveying elements of the apparatus to be used in the manner described above in some other context.

| List of designations | |
|---|---|
| 10 | Pack |
| 11 | Folding turret |
| 12 | Front wall |
| 13 | Rear wall |
| 14 | Side wall |
| 15 | Side wall |
| 16 | End wall |
| 17 | End wall |
| 18 | Sealing element |
| 19 | Pack path |
| 20 | Upright conveyor |
| 21 | Conveying section |
| 22 | Sealing subassembly |
| 23 | Intermediate conveyor |
| 24 | Accumulating conveyor |
| 25 | Pushing-off station |
| 26 | Pocket conveyor |
| 27 | Toothed belt |
| 28 | Carry-along element |
| 29 | Pocket |
| 30 | Gear wheel |
| 31 | Gear wheel |
| 32 | Servomotor |
| 33 | Underlying surface |
| 34 | Conveying strand |
| 35 | Sealing jaw |
| 36 | Sealing jaw |
| 37 | Sealing surface |
| 38 | Sealing surface |
| 39 | Aligning means |
| 40 | Path |
| 41 | Path |
| 42 | Ejector |
| 43 | Leg |
| 44 | Carrying leg |
| 45 | Bridge plate |
| 46 | Transfer conveyor |
| 47 | Belt |
| 48 | Top belt |

-continued

List of designations

| 49 | Bottom belt |
| 50 | Top belt |
| 51 | Bottom belt |
| 52 | Line of packs |
| 53 | Bottom conveyor |
| 54 | Covering plate |
| 55 | Pack group |
| 56 | End stop |
| 57 | Pivot arm |
| 58 | Pushing-off means |
| 59 | Three-phase motor |
| 60 | Drive belt |
| 61 | Drive wheel |
| 62 | Drive wheel |
| 63 | Deflecting wheel |
| 64 | Drive |
| 65 | Angular gear mechanism |
| 66 | Drive belt |
| 67 | Drive shaft |
| 68 | Deflecting roller |
| 69 | Servodrive |
| 70 | Drive roller |
| 71 | Drive roller |

We claim:

1. An apparatus for manufacturing cuboid-shaped packs, with an outer wrapper made of sealable packaging material, which can be sealed in the region of a sealing subassembly positioned along a horizontal conveying section, said apparatus comprising:
   a) an upright conveyor for providing said packs in an upward movement to said horizontal conveying section,
   b) said horizontal conveying section including a horizontal pocket conveyor for transporting said packs with the end walls of said packs being directed laterally in the region of said sealing subassembly,
   c) said horizontal pocket conveyor having a plurality of carry-along elements projecting transversely therefrom from an endless conveyor defining pockets for receiving and transporting said packs from said upright conveyor in non-continuous succession laterally along said horizontal pocket conveyor,
   d) said pockets defined by the carry-along elements sized to correspond approximately to the dimension of a pack;
   e) each said carry-along element serving to separate two successive pockets;
   f) said horizontal conveying section providing a downwardly directed conveying strand positioned in association with said pocket conveyor with said packs lying in slip fashion on a fixed base as they are transported by said pocket conveyor;
   g) said packs transported by said pocket conveyor being gripped in succession at the top side of said upright conveyor by the carry-along elements by transverse thrust; and
   h) in the region of exit from the pocket conveyor, said packs are transferred, by virtue of the opening of the pockets, to a transfer conveyor which removes said packs out of the region of the pocket conveyor.

2. The apparatus of claim 1 where said horizontal pocket conveyor operates to define a path of movement of said packs, and said apparatus further comprises:
   (a) sealing elements positioned at either side of said path of movement of said packs in the region of said pocket conveyor;
   (b) said sealing elements comprising a plurality of sealing jaws arranged in succession along said path of movement; and
   (c) said sealing jaws adapted to individually operate in cycles independently from one another such that at least one said sealing jaw temporary abuts a facing surface of one of said packs in a transverse manner relative to said path of movement.

3. The apparatus of claim 2 wherein said sealing jaws have mutually offset sealing surfaces such that said sealing jaws can displace in a direction transverse to said path of movement one of said packs of a pack group relative to another said pack of said pack group to define a offset relative position of said packs of said pack group.

4. The apparatus of claim 3 further comprising alignment means positioned in said path of movement following the said sealing jaws to correct the alignment of said packs relative to said path of movement.

5. The apparatus of claim 1 wherein at least two said packs at one time, lying one above the other, are simultaneously pushed by said horizontal pocket conveyor and received from said upright conveyor into a single said pocket of said horizontal pocket conveyor.

6. The apparatus of claim 1 wherein said carry-along elements defining said pockets are essentially free from play when said pockets are accommodating said packs.

7. The apparatus according to claim 2, wherein said sealing jaws have mutually offset sealing surfaces such that, when said sealing jaws abut said packs, said packs can be displaced in the transverse direction with respect to one another into an offset relative position and that following said scaling jaws are aligning means to provide correct alignment of said packs.

8. The apparatus according to claim 1, wherein in the region of opening of said carry-along elements of said pocket conveyor, said packs are transferred, by virtue of said pockets being opened, to a transfer conveyor which grasps said packs, accelerates them and transfers them to an intermediate conveyor.

9. The apparatus according to claim 1 wherein a group of packs each comprising a plurality of packs positioned in close proximity to one another, is separated off from the following packs for the transverse pushing off of a continuous line of packs to form a gap between said pack group and said following line of packs, and
   a) said line of packs, including said pack group to be separated out is conveyed by at least two successive endless conveyors including a bottom conveyor and bottom belt,
   b) after a group of packs has been formed on the bottom conveyor lying to the front in the conveying direction, said bottom belt lying in front of said bottom conveyor can be driven in the opposite conveying direction in such a way that the next line of packs following the pack group on the bottom belt can be removed from said pack group to form a gap, and
   c) said pack group on said bottom conveyor can be pushed off from said bottom conveyor by a pushing-off means displaceable in the transverse direction.

10. The apparatus according to claim 9, further comprising:
    a) an intermediate endless conveyor arranged upstream of said bottom belt in the conveying direction of said packs, on which said packs can be conveyed in the conveying direction at a distance from one another, and
    b) the line of packs formed on said bottom belt can, during a reverse conveying drive of said bottom belt, be conveyed back into the region of the intermediate conveyor as the latter is likewise being driven in the reverse direction with a plurality of successive packs being united in tight formation in the region of said intermediate conveyor.

11. The apparatus of claim 1, wherein the upright conveyor and the horizontal pocket conveyor define a conveying path for the packs, and a plurality of individually displaceable, stationary sealing jaws are positioned along the conveying path for the packs, the sealing jaws having sealing surfaces, which are arranged offset to one another such that the packs can be pushed against one another in a transverse direction when they are pressed by the sealing jaws.

12. Apparatus according to claim 11, wherein the packs are arranged one above the other and are pushed in a transverse direction when they are pressed by the sealing jaws.

13. Apparatus according to claim 11, wherein the packs are arranged adjacent to one another and are pushed in a transverse direction when they are pressed by the sealing jaws.

14. Apparatus according to claim 11, wherein following the sealing jaws, aligning means act on the packs for the correct alignment of same.

\* \* \* \* \*